3,007,953
ARYL MANGANESE CARBONYL COMPOUNDS
AND PROCESS
Rex D. Closson, Northville, and Thomas H. Coffield, Farmington, Mich., assignors to Ethyl Corporation, New York, N.Y., a corporation of Delaware
No Drawing. Filed Mar. 26, 1959, Ser. No. 801,997
9 Claims. (Cl. 260—429)

This invention relates to novel organometallic compounds and more specifically, to aryl manganese carbonyl compounds wherein manganese is bonded to an organic residue and a plurality of carbonyl coordinating groups. This application is a continuation-in-part of our co-pending application Serial No. 645,675, filed March 13, 1957, and now abandoned.

It is an object of this invention to provide a novel class of aryl manangese compounds. Another object is to provide a class of aryl manganese carbonyl compounds. A further object is to provide a process for the preparation of aryl manganese carbonyl compounds. Other objects of this invention will become apparent by reading the following detailed description of our invention.

The objects of this invention are accomplished by providing an aryl manganese pentacarbonyl compound. Such a compound is represented by the formula $RMn(CO)_5$ where "R" is a univalent aryl group. The aryl groups represented by "R" preferably contain from about six to about 17 carbon atoms. Further, they may be substituted with a wide variety of substituent groups. As used in this specification, therefore, the term "aryl" should be construed to include substituted aryl groups as well as non-substituted aryl groups. The aryl groups represented by "R" include fused ring systems as well as mononuclear ring groups.

Typical of the substituents which may be present in "R," as defined above, are alkyl, halogen, alkoxy, aryloxy, carbethoxy, carbamide, thioether, nitro, nitroso and hydoxy groups. Typical aryl manganese pentacarbonyl compounds within the scope of our invention are phenyl manganese pentacarbonyl, p-methoxyphenyl manganese pentacarbonyl, p-allylphenyl manganese pentacarbonyl, 2,4,6-trichlorophenoxyphenyl manganese pentacarbonyl, naphthyl manganese pentacarbonyl, anthracyl manganese pentacarbonyl, phenanthryl manganese pentacarbonyl, p-methylthiophenyl manganese pentacarbonyl, p-hydroxyphenyl manganese pentacarbonyl, 4-(4-nitroamyl) phenyl manganese pentacarbonyl, 4-propynylphenyl manganese pentacarbonyl, 2,4-di-tert-butyl-6-propylphenyl manganese pentacarbonyl, 2,5-di-nitrophenyl manganese pentacarbonyl, p-fluorophenyl manganese pentacarbonyl, 3-iodophenyl manganese pentacarbonyl and the like.

Although our invention is directed to aryl manganese pentacarbonyl compounds, it should be understood that analogous compounds of technetium and rhenium may be formed in a like manner. Thus, the analogous compounds of technetium and rhenium are equivalent to our manganese compounds for purposes of our invention.

The aryl manganese pentacarbonyl compounds of our invention are prepared by decarbonylation of acyl manganese pentacarbonyl compounds having the general formula $RCOMn(CO)_5$. In the above formula, the term "R" is an aryl group having the same meaning as set forth above. The acyl manganese pentacarbonyl compounds are more fully described in our application Serial No. 801,996 which was filed concurrently with this application. These compounds are generally prepared through either one of two methods. The first method involves reaction between an acylating agent such as an acyl halide and an alkali metal manganese pentacarbonyl. In this reaction, the acyl group displaces the alkali metal from the alkali manganese pentacarbonyl to form the acyl manganese pentacarbonyl compound. The second method for preparation of acyl manganese pentacarbonyl compounds involves the reaction of carbon monoxide with an aryl manganese pentacarbonyl compound. These methods are fully described in our above mentioned co-pending application.

Decarbonylation of the acyl manganese pentacarbonyl compound is accomplished by pyrolysis of the acyl manganese pentacarbonyl. In general, the temperature employed for pyrolysis ranges from between about 20 to about 225° C. A preferred temperature range is between about 50 to about 130° C. Preferably, decarbonylation is carried out under slightly reduced pressure conditions.

Examples illustrating preparation of our novel compounds through decarbonylation of the corresponding acyl manganese pentacarbonyl compounds are illustrated by the following. In these examples, all parts and percentages are by weight unless otherwise indicated.

*Example I*

100 parts of benzoyl manganese pentacarbonyl were heated under vacuum to 100° C. by means of an oil bath. At 90° C. the compound began to melt with vigorous evolution of gas. After the gas evolution had ceased, the melt was cooled and solidified. The evolved gas was collected and found to be almost pure carbon monoxide. The pale yellow solid which resulted on cooling had a melting point of 50 to 53° C. after resublimation. 78 parts of this yellow solid were collected. Infrared and elemental analysis showed the compound to be phenyl manganese pentacarbonyl. Anal. calcd. for $C_{11}H_5O_5Mn$: C, 48.5; H, 1.85; Mn, 20.2. Found: C, 48.9; H, 1.95; Mn, 20.2.

*Example II* p-Phenyl benzoyl manganese pentacarbonyl is prepared by the reaction of sodium manganese pentacarbonyl and p-phenyl benzoyl chloride. The product of the reaction is carefully heated. The heating is accompanied by the evolution of carbon monoxide to give a good yield of para biphenyl manganese pentacarbonyl.

*Example III* p-Methoxybenzoyl manganese pentacarbonyl, prepared by reacting p-methoxybenzoyl chloride and sodium manganese pentacarbonyl, is heated gently under slightly reduced pressure conditions. At a temperature of about 100° C., vigorous evolution of gas occurs and on cooling the product p-methoxyphenyl manganese pentacarbonyl is obtained.

*Example IV*

One hundred parts of 3-carboxymethylbenzoyl manganese pentacarbonyl, made from reaction of 3-carboxymethylbenzoyl bromide with sodium manganese pentacarbonyl, is heated gently under slightly reduced pressure. At about 100° C., evolution of gas is observed. This temperature is maintained until gas evolution ceases. It is then cooled slowly and the product 3-carboxymethylphenyl manganese pentacarbonyl is obtained in good yield.

*Example V*

10 parts of p-nitrosobenzoyl manganese pentacarbonyl, prepared by reacting p-nitrosobenzoyl chloride and lithium manganese pentacarbonyl, are gently heated under slightly reduced pressure. Heating in the vicinity of 100° C. is accompanied by evolution of gas from the material. This temperature is maintained until gas evolution ceases whereupon the material is gradually cooled to give a good yield of p-nitrosophenyl manganese pentacarbonyl.

*Example VI*

27 parts of p-tert-butylbenzoyl manganese pentacarbonyl, prepared by reacting p-tert-butylbenzoyl iodide and sodium manganese pentacarbonyl, are heated gently until gas evolution is observed. When gas evolution ceases, the contents are slowly cooled to give a good yield of p-tert-butylphenyl manganese pentacarbonyl.

*Example VII*

15 parts of p-phenoxybenzoyl manganese pentacarbonyl, prepared by reacting p-phenoxybenzoyl bromide with potassium manganese pentacarbonyl, are heated gently under reduced pressure conditions until evolution of gas is noted. At this point, heating is discontinued, and the material is slowly cooled to give a good yield of p-phenoxyphenyl manganese pentacarbonyl.

As shown by our examples, decarbonylation of the corresponding acyl compounds makes possible the preparation of a wide variety of the aryl manganese pentacarbonyl compounds of our invention. Decarbonylation of, for example, naphthoyl manganese pentacarbonyl, 8-nitro-1-naphthoyl manganese pentacarbonyl and p-allylbenzoyl manganese pentacarbonyl will produce the new compounds naphthyl manganese pentacarbonyl, 8-nitro-1-naphthyl manganese pentacarbonyl and p-allyl-phenyl manganese pentacarbonyl.

The aryl manganese pentacarbonyl compounds of this invention are useful as catalysts in what is known as the oxo synthesis of aldehydes and alcohols. An embodiment of the oxo synthesis consists of treating an olefinic hydrocarbon with hydrogen and carbon monoxide under pressure in the presence of a catalyst. When an aryl managnese pentacarbonyl compound of our invention is used as the catalyst in this reaction, excellent yields of oxo synthesis products are obtained as illustrated by the following example.

*Example VIII*

The apparatus consists of a pressure vessel equipped with means for agitation and means for heating and cooling. The vessel is also equipped with openings for introduction of gases, liquids and solids.

In this vessel is placed 500 parts of hexane and five parts of phenyl manganese pentacarbonyl. Five-hundred pounds of ethylene pressure are imposed on this mixture and then the reactor is further pressured with 970 p.s.i. of a 1:1 mixture of carbon monoxide and hydrogen (synthesis gas). The reaction is heated with agitation at a temperature of 75° C. for one hour while maintaining the total pressure at 1470 p.s.i. At the end of this time, the reaction mixture is cooled and vented to the atmosphere through a dry ice trap. In the trap are collected a mixture of products consisting of propionaldehyde and n-propyl alcohol. A good yield of these materials is obtained.

The compounds of this invention are also useful as chemical intermediates. For example, bromination of the phenyl compound gives phenyl bromide in addition to bromo manganese pentacarbonyl which is also obtained by direct bromination of manganese carbonyl.

The aryl manganese pentacarbonyl compounds of this invention are effective antiknock agents when added to gasoline used in the operation of spark ignition internal combustion engines. For example, when 0.5 and 1.0 gram of manganese per gallon as phenyl manganese pentacarbonyl were added to gasoline having a research octane number of 91.8, the resulting fuels had octane numbers of 94.0 and 95.5 respectively. The octane number was measured by Procedure D–908–55 of the American Society for Testing Materials. This procedure is known as the Research Method and is more fully described in the 1956 edition of "ASTM Manual of Engine Test Methods."

Having fully described the nature of the present invention, it is intended that it be limited only within the spirit and scope of the appended claims.

We claim:

1. An organometallic compound of manganese having the formula $RMn(CO)_5$ where "R" is a univalent aryl hydrocarbon group.

2. The compound of claim 1 wherein "R" contains from about six to about 17 carobn atoms.

3. An organometallic compound of manganese having the formula $RMn(CO)_5$ where "R" is a univalent aryl hydrocarbon group which is substituted with groups selected from the class consisting of alkyl, halogen, alkoxy, aryloxy, carbethoxy, carbamide, thioether, nitro, nitroso, and hydroxy groups.

4. Phenyl manganese pentacarbonyl.

5. A process for preparing organometallic manganese compounds having the formula $RMn(CO)_5$ wherein "R" is a univalent aryl hydrocarbon group said process comprising pyrolizing, at temperatures between about 20 to about 225° C. an acyl manganese pentacarbonyl compound having the formula $RCOMn(CO)_5$ in which "R" is a univalent aryl hydrocarbon group.

6. The method of claim 5 wherein the acyl manganese pentacarbonyl compound having the formula $$RCOMn(CO)_5$$

has from about six to about 17 carbon atoms in the univalent aryl hydrocarbon group represented by "R."

7. The method of claim 6 wherein the pyrolysis is carried out under slightly reduced pressure conditions.

8. The method of claim 7 wherein the pyrolysis is carried out in the temperature range between about 50 to about 130° C.

9. A process for preparing organometallic compounds having the formula $RMn(CO)_5$ wherein "R" is a univalent aryl hydrocarbon group which is substituted with groups selected from the class consisting of alkyl, halogen, alkoxy, aryloxy, carbethoxy, carbamide, thioether, nitro, nitroso, and hydroxy groups, said process comprising pyrolyzing at temperatures between about 20 to about 225° C. an acyl manganese pentacarbonyl compound having the formula $RCOMn(CO)_5$ in which "R" is a univalent aryl group which is substituted with groups selected from the class consisting of alkyl, halogen, alkoxy, aryloxy, carbethoxy, carbamide, thioether, nitro, nitroso, and hydroxy groups.

No references cited.